US011968165B1

(12) United States Patent
Lopez Moreno et al.

(10) Patent No.: US 11,968,165 B1
(45) Date of Patent: Apr. 23, 2024

(54) LEVERAGING AFFINITY BETWEEN CONTENT CREATOR AND VIEWER TO IMPROVE CREATOR RETENTION

(71) Applicant: Microsoft Technology Licensing, LLC, Redmond, WA (US)

(72) Inventors: Ivan Lopez Moreno, Dublin (IE); Xuexin Ren, Sunnyvale, CA (US); Ying Han, Sunnyvale, CA (US); Shaunak Chatterjee, Sunnyvale, CA (US); Ajith Muralidharan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/086,138

(22) Filed: Dec. 21, 2022

(51) Int. Cl.
| | | |
|---|---|---|
| *H04L 12/58* | (2006.01) | |
| *G06N 20/00* | (2019.01) | |
| *G06Q 50/00* | (2012.01) | |
| *H04L 51/10* | (2022.01) | |
| *H04L 51/52* | (2022.01) | |

(52) U.S. Cl.
CPC ............. *H04L 51/52* (2022.05); *G06N 20/00* (2019.01); *G06Q 50/01* (2013.01); *H04L 51/10* (2013.01)

(58) Field of Classification Search
None
See application file for complete search history.

(56) References Cited

U.S. PATENT DOCUMENTS

| | | | | |
|---|---|---|---|---|
| 10,084,732 | B1* | 9/2018 | Smarr | H04L 67/306 |
| 2014/0172995 | A1* | 6/2014 | Deeter | H04L 51/52 |
| | | | | 709/206 |
| 2014/0172996 | A1* | 6/2014 | Deeter | H04L 51/214 |
| | | | | 709/206 |
| 2020/0329005 | A1* | 10/2020 | Anerella | H04L 51/224 |
| 2022/0247709 | A1* | 8/2022 | Anerella | H04L 51/224 |

* cited by examiner

*Primary Examiner* — Natisha D Cox
(74) *Attorney, Agent, or Firm* — Schwegman, Lundberg & Woessner, P.A.

(57) ABSTRACT

Methods, systems, and computer programs are presented for selecting notifications based on an affinity score between a content generator and a viewer of the content. One method includes capturing interactions of content generators with notifications, received by the content generators, associated with viewer responses to creator-generated content items. The method further includes training a machine-learning model based on the interactions, and detecting a first set of notifications, for a first content generator, associated with interactions of a set of viewers to first-content generator content. The ML model calculates an affinity score between the first content generator and each viewer, and the set of first notifications are ranked based on the affinity scores of the first content generator and the viewer associated with each notification. A set of second notifications is selected based on the ranked first notifications; and generating notifications are generated, for the first content generator, for the selected set of second notifications.

17 Claims, 10 Drawing Sheets

LEVERAGING AFFINITY BETWEEN CONTENT CREATOR AND VIEWER TO IMPROVE CREATOR RETENTION

TECHNICAL FIELD

The subject matter disclosed herein generally relates to methods, systems, and machine-readable storage media for quantifying affinities between entities that are creating content to be distributed on a communications network and entities that are viewing the created content. The subject matter may include learning the affinity and incorporating the affinity as a utility in a recommendation system.

BACKGROUND

Communications networks conventionally enable a variety of types of entities (e.g., users) to post content to the communications network to be viewed by other users of the communications network. Entities may include users, members, companies, groups, sponsors, and the like that create, upload, share, and provide content items to the communications network. For instance, users who are connected to another user that is a content creator may receive and view content items that the content creator has posted to the communications network. In other instances, users that follow a company or group may receive, see, or view content items posted by that company or group.

Current systems focus on the interest of viewers towards content and towards the creators of the content, in order to present the most-interesting items for the viewers. However, current systems do not take into consideration the interest of the content creator, such as which users are the preferred targets for the content they create.

Thus, a system is needed that takes into consideration the targeted audience of the content creator. In a network system with millions of users, trying to score the ranking for the potential recipients (from the point of view of the creator) is a daunting task that could be very expensive in terms of computing resources.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
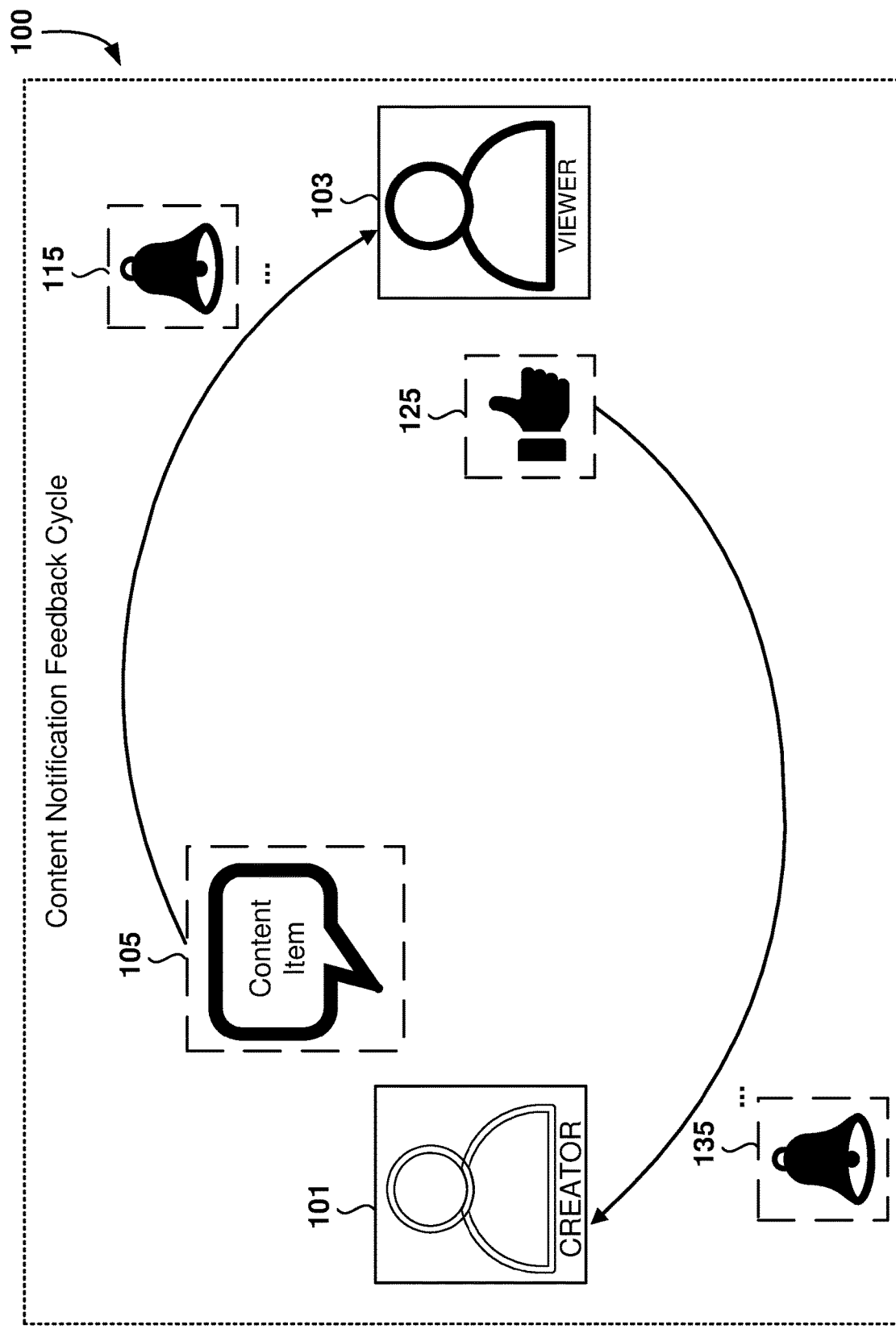
FIG. 1 illustrates a content notification feedback cycle in a communications network system, according to some example embodiments.

Example methods, systems, and computer programs are directed to learning affinity between content creator and viewer to improve content-creator retention in a communications network by training a machine-learning (ML) model using training data that includes quantified affinity data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Overview

For the purposes of this description the phrases "a communications network," "an online social networking application," "a social network," and "an online social network system" may be referred to as and used interchangeably with the phrases "an online system," "an online service," "a networked system," or merely "a connections network." It will also be noted that a communications network may be any type of an online network, such as, e.g., a professional network, an interest-based network, or any online networking system that permits users to join as registered members. For the purposes of this description, registered members of a communications network may be referred to as simply members or users, and some un-registered users may also access the services provided by the online service. As used herein, a "user" refers to any person accessing the service, either registered or unregistered. Further, some communications networks provide services to their members (e.g., search for jobs, search for candidates for jobs, job postings) without being a social network, and the principles presented herein may also be applied to these connection networks.

Example embodiments of the present disclosure include a communications network, such as a social network system that includes a content distribution platform for the creation, exchange, and display (e.g., posting) of content items between two users on the communications network, such as a content-creator and a content-viewer. In content distribution, there are two sides: one side is the creator, and the other one is the viewer. In the communications network, the creators actively produce content items, and the viewers passively consume the content items, although a user may be a creator for some content and a viewer for other content. A healthy ecosystem creates the best experience for both parties. When a creator writes a post and a viewer likes it, the "like" will generate feedback to the creator. Such feedback is motivating for the creator to return to the communications network and create additional content. Typically, not all viewers are equally important to the creator.

Conventional systems are generally agnostic or insensitive to prioritize content for viewers based on the creator's preferences related to which viewers would be more interesting for the creator. However, conventional social networks simply present content items to users according to conventional schemes that focus on the interest of the viewer without taking into consideration the preferences of the creator.

A system has been developed that determines an affinity score, referred to herein as rAffinity, between the creator and the viewer with the goal of enhancing the experience of the creator (e.g., to promote creator retention and increase creation amount in the communications network). The system can determine the rAffinity score that can be leveraged to connect creators to viewers that are important to the creator. For example, the rAffinity score can be calculated and normalized in order to be utilized as a utility function in notifications services to notify creators when viewers important to the creator engage with the content item.

The rAffinity score is the probability that a creator interacts (e.g., opens, clicks) with a notification that a viewer interacted (e.g., accessed, liked, commented, shared) with content created by the creator. Additionally, an eAffinity score is the affinity score from the viewer to the creator, that is, the probability that the viewer will interact with the content from the creator.

Example embodiments disclosed herein provide technical solutions and improvements to the relevant technology related to content distribution and/or recommendation services, such as other content notification systems. Such technical solutions include the capability to 1) quantify the rAffinity score between a creator and each potential viewer of the creator's network, and 2) incorporate the quantified rAffinity score as a utility in a recommendation service to enhance the creator experience on the communications network. In online communications networks that include social media experiences, not all content viewers are similarly or equally important to each creator. In order for creators to reach the specific target audience important to that creator, example embodiments include a communications network configured to provide one or more services to enhance the content distribution for each creator. Such improvements enable example embodiments of the present disclosure to use multiple content distribution channels, such as a notifications service, a user-feed service, a discovery service, and other forms of notification systems to distribute creator content.

In a communications network with a large number of users (e.g., a hundred million or more users), producing rAffinity scores for all the entity pairs (e.g., for every pair of creators and viewers) periodically may be prohibitively costly in terms of computing resources that may cause latency and throughput problems. To overcome this limitation, example embodiments describe methods for determining the creator-to-viewer rAffinity score for specific pairs of creators and viewers. This solves the limitations of the cardinality of the outputs but introduces new technical challenges. One of the new technical challenges is constructing an agnostic signal of creator-viewer affinity, where a machine learning model can receive data from multiple sources and/or in multiple formats and continue to process the creator-to-viewer affinity in an effective manner.

Existing models fail to overcome such technical challenges. For example, an existing Click-Through-Rate (CTR) model produces a score for each presented item, the existing eAffinity model produces the affinity score from the perspective of the viewer, and an existing connection strength (e.g., CCX) model produces the probability of having an interaction between two users. But these metrics fail to take into consideration the preferences for the creator as related to preferred viewers.

Example embodiments of the present disclosure improve upon existing models and overcome such current technical challenges by producing the rAffinity score for each creator-viewer pair and producing a model of the probability of a reaction to an initial interaction. Thus, example embodiments of the present disclosure solve the technical problem relating to content distribution by quantifying the rAffinity score from a creator to each potential viewer (e.g., viewers connected to the creator on the communications network and/or viewers on the communications network not connected to the creator) and incorporating the rAffinity score as a utility in a recommender system to recommend content to users that will increase a reaction by the creator to the viewer's initial interaction with the content item.

While there are many machine-learning (ML) products that represent the interest of viewers towards creators or towards content, an rAffinity model presented herein represents the affinity or relation of interest from the creator to the viewer (e.g., creator-to-viewer, also referred to as recipient-to-actor). One example method to segment these signals of creator-to-viewer affinity is according to their definitions of interest and by the direction of the relation. For example, there exist many data points in the definition of interest from which the expression of interest can be inferred. For example, the expression of interest can be used to compute a) direct (e.g., explicit) expressions of interest, such as a viewer liking a post of a creator in the viewer's feed, and b) indirect expressions of interest, such as the dwell time that a viewer spends consulting the content from a creator (where the viewer's interest is only deduced). For example, in the direction of the relation, the eAffinity of the viewer for the creator is different from the rAffinity of the creator for the viewer. As such, example embodiments provide for the calculating of creator-to-viewer affinities.

DETAILED EMBODIMENTS

FIG. 1 illustrates a block diagram of a content notification feedback cycle 100 in a communications network, which may include a content distribution network, according to some example embodiments. The content notification feedback cycle 100 depicts a first user who is the content creator 101 (e.g., a content generator) and a second user who is the viewer 103. In some example embodiments, the content creator 101 and the viewer 103 are connected in the communications network, but other embodiments may include un-connected viewers.

The example embodiment of FIG. 1 includes a process for determining the rAffinity scores between users. An example communications network includes content distribution among creators and viewers. The content creator 101 is a user that creates, generates, posts, or writes content items, such as a post on the communications network. The viewer 103 is a user that consumes, views, or interacts with the created content and generates feedback to the creator. Of course, a given user may be a creator for some items and a viewer for other items. Such viewer feedback provides motivation for the content creator 101 to return to the connections network, create more content, and generate future posts.

These example embodiments can be used in a variety of content sharing situations, such as content for advertisements to be presented on a user's feed, job-posting content, news items on a user's feed, social activity, etc. For example, a creator may create a piece of content and receive a notification about the interaction of a non-connected user with the content; the system then measures the rAffinity based on the interaction of the creator with the notification and then generate a People-You-May-Know (PYMK) notification for the creator about the non-connected user (e.g., given a high level of interest of the creator for the notification). However, for simplicity, the detailed embodiments will describe examples for selecting viewers for the content generated by the creator, but the same principles may be used for other types of content and content sharing.

In some example embodiments, the content creator 101 creates a content item 105, such as a user-feed post, to be shared with the content creator's network or the online service in general. When the content creator 101 posts the new content item 105, the system generates a content notification 115 for the viewer 103, such as a shared-by-your-network (SBYN) notification, to notify the content creator's audience, such as the viewer 103. Specifically, in response to the content item 105, the system generates the content notification 115 to notify selected viewers, which helps the content creator 101 reach their target audience.

Once the content item 105 is viewed by the viewer 103 and the viewer provides feedback 125 (e.g., such as a "like" or a "comment"), the system generates a second notification 135 to be presented to the content creator 101. The second notification 135 informs the content creator 101 that a viewer has generated feedback in response to the content item 105.

The content notification feedback cycle 100 creates a feedback loop, where machine-learning models are implemented to leverage data from social activity notifications to optimize the relevance of content notifications (e.g., SBYN notifications). For example, how the content creator 101 responds to generated feedback (e.g., likes) from different content viewers provides signaling data to the system related to which viewer 103 matters to the content creator.

Social activity notifications (described in detail in relation to FIG. 5) may be used to promote the content item 105 created by the content creator 101 when the viewer 103 has acted upon the content item. For example, the viewer 103 becomes a social actor when the viewer interacts with the content item in a social manner (e.g., engagement with the content item). Engagement with the content item can be determined based on any one or more of a plurality of metrics used to measure interactions, such as liking, sharing, commenting, dwell time (e.g., the amount of time a user spends viewing the content), click-through-rate on any links included in the content, and/or additional engagement metrics that are used to measure the level of engagement with the content currently or in the future. Once the viewer becomes a social actor with respect to the content item 105 by "liking" the content item, the communications network generates the second notification 135 (e.g., a social activity notification) to present to the content creator 101. The second notification 135 may include any notification that provides the content creator 101 with feedback related to the posted content item.

While example embodiments depict using notifications and posting in a communications network to describe rAffinity, a person having ordinary skill in the art can apply such examples to other portions of a communications network for content creation. For example, the rAffinity model as disclosed herein can be applied to any applications or services of the communications network, such as user-feed services, notifications services, search services, etc. For example, the rAffinity can be used to rank and send SBYN notifications, improving click-through-rate of SBYN notifications sent, increasing the number of user sessions, and other notification types. A session refers to a use of the communications networking service by the user, such as reading the feed, making a comment, adding a post, responding to a notification, or other user engagement, without an interruption longer than a predetermined amount of time. In some example embodiments, a session may end after a certain amount of time has passed or when the user logs out of the communications network or otherwise explicitly ends the session. In additional example embodiments, the communications network can employ cookies or other tracking technologies to maintain user sessions across multiple visits or devices.

In additional example embodiments, user-generated content can also be delivered to users through feed and search in the communications network. For example, using the rAffinity model integrated into the feed/search ranking algorithm, content creators get exposure to users who the content creator cares about by promoting the content creator's content to these users. Embodiments are presented regarding the rAffinity of the creator with a viewer that reacted to the content generated by the creator, but other embodiments may be based on other types of notifications related to other scenarios. For example, the user may receive notifications for People Who Viewed Your Profile (PWVYP) and the rAffinity of the user with the other users may be calculated based on the PWVYP notifications. When the user receives a PWVYP notification that another user has viewed the user's profile, the user can interact with the notification (e.g., click on the notification, click on the viewer's profile, or otherwise engage with the notification or viewer), which can be used to calculate the rAffinity score), and the notifications presented to the user will be prioritized based on the rAffinity score. Additional example embodiments provide for activity actions for the creator to proactively indicate an interest in a particular viewer; for example, the creator can "tag" one or more viewers of interest to the creator in the content post or share the content post with the particular viewer of interest.

In some example embodiments, the rAffinity model calculates the rAffinity from the content creator 101 to the viewer 103. In some example embodiments, the rAffinity model uses data regarding Click Through Rates (CTR) of the content creator 101 for notifications originated by their viewers, which provides the communication network with a direct expression of the creator's interest in the viewer, which can be expressed as: p(Creator click|Viewer, Edge), or the probability that the creator clicks on a notification from the viewer, where the Edge refers to a link or connection between the creator and the viewer in the communications network. In some example embodiments, in the ranking of multiple notifications, the rAffinity model provides a signal to forecast and predict the preference of the content creator 101. This can be used for both ranking the notifications of the creator (first-degree) and the notifications of the viewers (second-degree) to yield the highest creator CTR.

In the SBYN notification use case, the rAffinity model enables the communications network to drive creator retention through viewer-side intervention, where the intervention includes the communications network prioritizing content to viewers who matter more (e.g., viewers with a higher rAffinity score) to the creator. In a social activity (SA) notification use case, the rAffinity model enables the communications network to drive sessions through creator-side intervention, where the intervention includes the communications network sending push notifications to creators when viewers with a higher rAffinity score interacted with their content. The use of the rAffinity score will result in presenting notifications that are more interesting to the creator, and by providing more interesting notifications, the expectation is that the creator will increase the level of engagement with the online service, resulting in improved customer satisfaction and increased revenue for the online service because of the increase level of activity.

Figure 2:
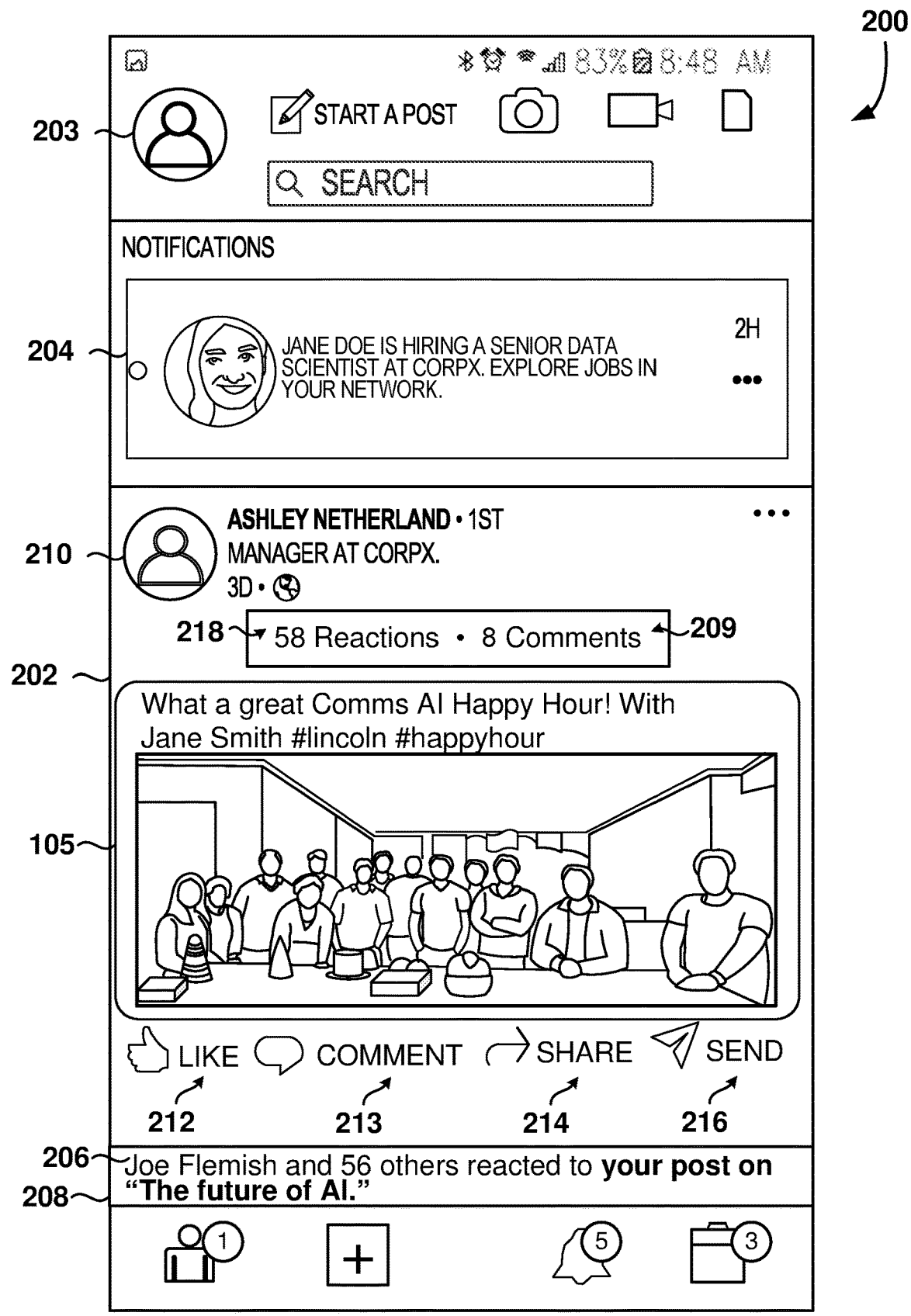
FIG. 2 illustrates a screenshot of a user feed, according to some example embodiments.

FIG. 2 illustrates a screenshot 200 of a user feed 202 for a user 203, according to some example embodiments. In the illustrated example, the user 203, named Jane Smith, may be a creator of content or a viewer of content generated by other users.

The user feed 202 can include various categories such as notifications 204 and 208, a search field, job recommendations, content item 105, sponsored items, shortcuts, news, messages, articles, and the like. The content item 105 can be published or posted on the user feed 202 to be viewed by the user 203 (which is a viewer for content item 105). The content item 105 is content created by a user 210 names Ashley Netherland (who is the creator of content item 105), such as videos, comments, pointers to articles, pointers to webpages, photographs, hashtags, and the like. As depicted in FIG. 2, the content item 105 is a post of a picture at a work event with the words "What a great Comms AI Happy Hour with Jane Smith," incorporating the hashtags #lincoln and #happyhour, created by Ashley Netherland, which is being viewed by the user 203.

The user 203 can engage with the content item 105 created by user 210 by "liking" 212 the content item 105, commenting 213 on the content item 105, sharing 214 the content item 105, sending 216 the content item 105, and the like. The user feed 202 further displays to the user 203 other viewers' engagement with the content item 105 by displaying a number of reactions 218 and a number of comments 209. In some embodiments, the content item 105 is displayed in the user feed 202, and the communications network formats the content item 105 for the user feed 202, where different viewers can be presented with varying formatting of the same content item 105. In some embodiments, the communications network selects portions of the content item 105 for display in different locations of different user feeds.

Notification 208 is a notification regarding the interaction of other users (e.g., viewers) with content generated by the user 203 (e.g., the creator with respect to this notification). The notification is "Joe Flemish and 56 others reacted to your post on The Future of AI." Thus, in this notification, the viewer Joe Flemish is highlighted by including his name because the system detected that user 203 has a high rAffinity with Joe Flemish.

In additional example embodiments, the rAffinity score is used to prioritize notifications to the user 203. For example, the rAffinity score can be leveraged to select the user Joe Flemish to include his name in the notification 208. Thus, the rAffinity score can be leveraged to display a viewer's name with the highest rAffinity to the content creator.

In some embodiments the communications network adds interactive elements or non-interactive elements to the user feed 202. For example, as illustrated in FIG. 2, "Like" 212, "Comment" 213, "Share" 214, "Send" 216, and "reacted to your post on The Future of AI" 206, are hotlinks for the user to interact with the display of the content item 105. For example, if the user selects "reacted to your post on The Future of AI" 206, then the communications network displays the full content item 105 by Ashley Netherland on the user interface.

Figure 3:
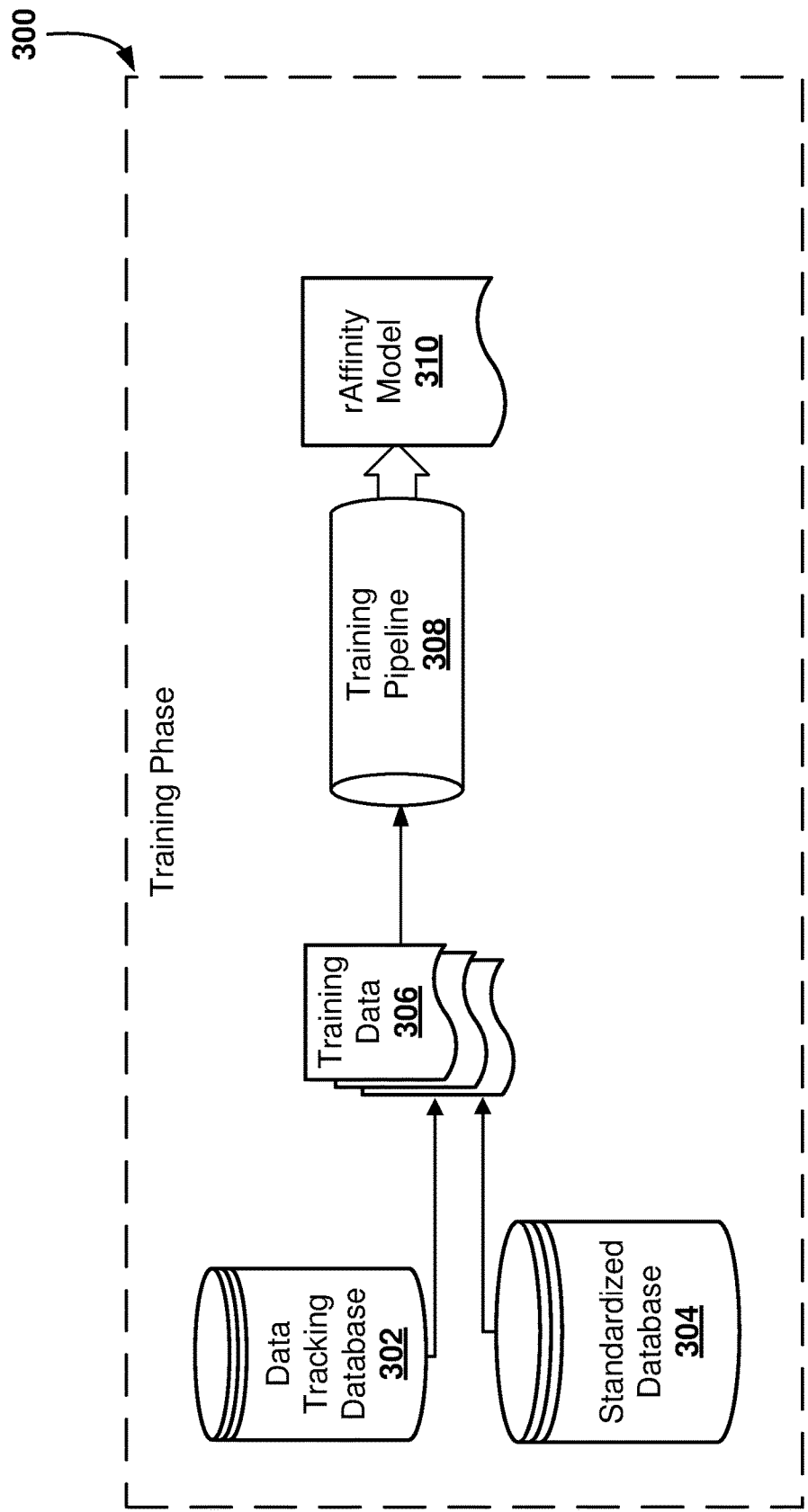
FIG. 3 is a diagram illustrating the training process to create an affinity model for determining an affinity score between two entities, in some example embodiments.

FIG. 3 is a diagram illustrating the training phase 300 to create an rAffinity model to calculate the rAffinity score, in some example embodiments. A training phase 300 is provided for preparation of a machine-learning (ML) training model, referred to as the rAffinity model 310.

A data tracking database 302 includes events related to interactions of the users with the communications network. The data tracking database 302 may include impression data that is recorded each time a user interacts with anything on the communications network. The impression data is collected over time for users and the communications network generates standardized representations of the impression data to be used in training the relational models. The communications network incorporates the generated standardized representations into a standardized database 304 that includes a library of normalized user-event data.

Data compiled in the data tracking database 302 and the standardized database 304 are provided as training data 306. The training data 306 can include, for example, edge feature data (e.g., eAffinity, feed, same company, close colleague, degree of connection, mutual connections, PYMK connection strength, network size difference, messages, profile views, endorsements, invite to connect, etc.), recipient features (e.g., public contributions, post frequency, audience builder, job seeker, message reply rate, etc.), social-actor features (e.g., seniority, influence, endorsements received, etc.), and entity features (e.g., post length, has image, has video, mentions, etc.). The training data 306 is used in a training pipeline 308 in order to generate the rAffinity model 310, which is the ML model for determining the rAffinity.

Example embodiments of FIG. 3 further provide for creating the rAffinity model 310 using algorithms described herein to determine the rAffinity score between the content creator and the viewer. However, before the machine learning model is trained, the system prepares the training data 306, including values of labels, for the training pipeline 308.

The rAffinity model 310 is configured to calculate the rAffinity score that represents the probability of a creator interacting with a notification from the communications network based on viewer engagement with content generated by the creator. Training pipeline 308 is provided with training data 306 that includes features captured by the communications network. The communication network captures features of the viewer, the creator, the creator-and-viewer pair, and the positive and negative interactions of creators with notifications to generate the training data 306. The training pipeline 308 then trains, using the training data 306, the rAffinity model 310 used for calculating the rAffinity score.

For example, the captured features may include what company the user works for, what school the user went to and during which dates, whether the user is sharing content in an original way or resharing previously created content, and other user activity on the communications network. Further, as the communication network services captures whether there is positive engagement (e.g., the creator clicked on a name in the notification) or negative engagement (e.g., the creator ignored the notification, failed to click on the notification, etc.) with notifications about interactions of viewers with content. In some example embodiments, a tree-based model is fed with millions of positive interactions (e.g., creator clicked on the notification to see all the viewers that reacted, creator reviewed positive reviews, creator clicked on the name of a viewer in the notification, creator clicked on the number of shares to obtain more details, creator showed a high dwell time on the notification, creator reviewed comments from the viewers, etc.) and negative interactions (e.g., creator ignored the notification) of creators with notifications from the communications network based on viewer engagement with content. That is, the system measures the interest of the creator on the notifications presented to learn which viewers are more interesting for the creator. The rAffinity score may be used to prioritize future notifications. In the illustrated example on FIG. 2, in notification 208, the viewer Joe Flemish has been identified as the viewer with the highest rAffinity score from all the viewers that reacted to the content, so the notification highlights Flemish by including his name, as in "Joe Flemish and 56 others reacted to your post on The Future of AI." In other embodiments, a notification exclusive for a viewer with a high rAffinity scored may be created, such as, "Joe Flemish reacted to your post." Further, the system may generate alarms (e.g., email, text message) to notify the creator that an "important" viewer has interacted with the creators' content.

The positive and negative interactions are labels used for the training data 306. After the rAffinity model has learned the patterns that emerge from the positive and negative interactions, the rAffinity model produces a rAffinity score (e.g., a score that is a real number between 0 and 1, an integer number between 0 and 100) between the creator and the viewer, which corresponds to the probability of the creator opening a notification from the communications network based on the viewer's engagement with the creator-generated content. The training of the model begins by collecting past interactions labeled by the reaction of the creator. The records are expanded with datapoints that describe the creator, the viewer, and the connection between the creator and the viewer. The rAffinity model 310 is then trained by feeding the previous datasets.

In some example embodiments, the rAffinity may be used for SBYN scenarios, where the creator reshares content with viewers who matter more (e.g., viewers with a higher rAffinity score) to the creator.

Figure 4:
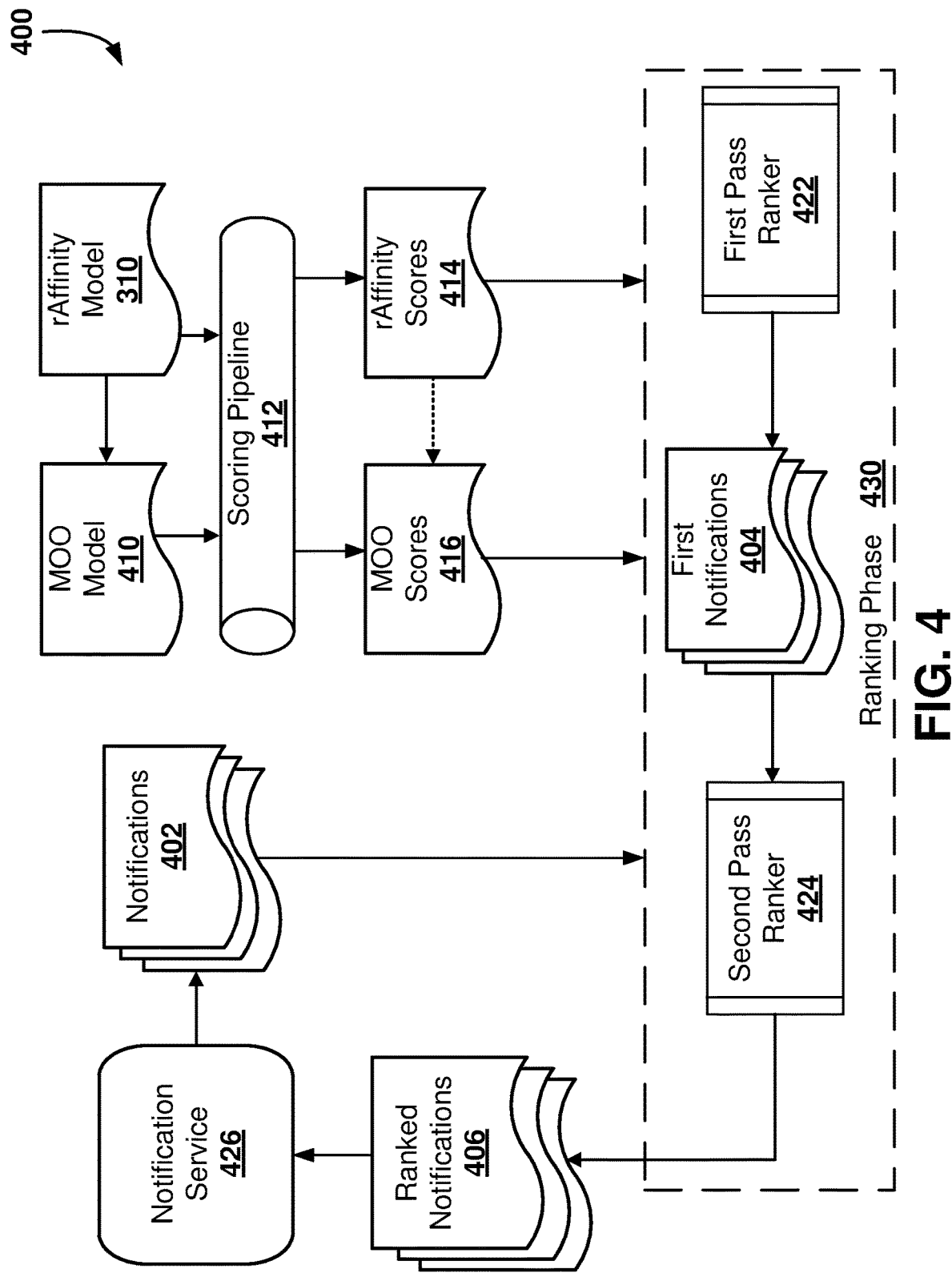
FIG. 4 is a diagram illustrating a ranking process to utilize the affinity score as a utility in a recommendation system, according to some example embodiments.

FIG. 4 is a diagram illustrating a recommendation system 400 for ranking content using the rAffinity score 414, according to some example embodiments.

The notification service 426 provides for determining, generating, classifying, and providing notifications 402 to users in a communications network, and can generate hundreds of notifications 402 for each user per day; however, a user may only receive a fraction of the generated notifications. In this example, the notifications 402 are for the viewer and are related to interactions of viewers with content generated by the creator. The notification service 426 generates the initial set of notifications 402 to be prioritized and filtered before being sent to the creator.

The rAffinity scores 414 are used during a ranking phase 430 to prioritize the notifications 402. In some example embodiments, the rAffinity scores 414 are calculated offline, by a scoring pipeline 412, for a plurality of pairs creator-viewer, so the rAffinity scores are readily available when the time comes to rank the notifications 402.

The rAffinity score 414 may be combined with other factors, such as a value of the individual notifications to the viewer or may be utilized without respect to other factors.

In some example embodiments, the rAffinity score is used in a multi-objective optimization (MOO) model 410 for filtering and prioritizing the notifications 402, resulting in improved quality targeting at the signaled audience, which is the creator.

In some example embodiments, the MOO model predicts a reward gained by sending a notification, where the reward can be the recipient (e.g., the creator) deciding to click on the notification, click on the content item, engage with the content item, begin a new session, etc. In example embodiments, the MOO model utilizes the rAffinity score 414 produced by the rAffinity model 310. As a result, the MOO scores 416 produced by the MOO model 410 are more likely to indicate a notification to be sent to the creator when the content creator has a high rAffinity score with the viewer associated with the notification.

In some example embodiments, the MOO reinforcement learning model is formulated as:

$$MOO\ score = p*pClick + \alpha*session - \beta*Volume + y*rAffinity + A*deltaPVisit$$

Here, rAffinity is the rAffinity score from the creator receiving the notification of a specific viewer that caused the notification 402. Further, the term (y*rAffinity) is the utility that is added to preferentially notify viewers whose feedback matters more to the creator. They parameter is a tunable hyperparameter to provide more or less weight to the rAffinity score 414 when compared to other factors used in the formula. Further, pClick is the probability that the creator clicks on the notification, session is a number of sessions over a specified time period, and Volume is the total volume of notifications over the specified period of time. The parameters $\alpha$ and $\beta$ are tunable parameters for the weight given to pClick and Volume respectively when calculating the MOO score. The input values for each parameter change dynamically based on multiple characteristics of the notification and the user that triggers the notification to be sent. In other embodiments, a reduced subset of these parameters may be used.

In some example embodiments, there are two types of variables used during the machine-learning training of each model. The variables include parameters and hyperparameters. Parameters include weights in which the models encode the function that relates inputs and predictions. The hyperparameters include inputs used to configure different aspects of the behavior of the models. In some embodiments, the parameters are machine-learned parameters and the hyperparameters are manually input variables. In additional examples, the parameters and hyperparameters are machine-learned, manually input, or a combination thereof. For example, in one embodiment, the MOO model includes one or more additional hyperparameters set prior to the training phase 300, which encodes initial inputs for different utilities, such as sessions, rAffinity, and volume, where pClick is the probability that the viewer clicks on the notification, session is the probability that the viewer has a session, and volume penalty to discourage sending too many notifications to the viewer. In alternative example embodiments, the variables may include additional parameters such as deltaPVisit, which is the time between visits of the viewer. In such examples, after the training phase 300 is completed, the MOO model 410 and/or the rAffinity model 310 have autonomously learned the one or more parameters, and the models express final correlations used to relate inputs and predictions. In additional example embodiments, the final correlations can be set manually (e.g., a manually weighted average to multiply each input by a weight to produce a final combination of scores). In further example embodiments, utilities (e.g., sessions, rAffinity, volume, etc.) may be added or removed from the training phase 300 in order to adjust the models.

A first pass ranker 422 does an initial filtering of the notifications 402 by ranking the notifications 402 according to a relevance score and then selecting a predetermined number of the top-ranked notifications 402. The results of the first pass ranker 422 are first notifications 404, which tends to be a much smaller set than that of notifications 402. For example, the initial number of notifications 402 may be on the order of 500 per user per day, and the number of first notifications 404 may be on the order of ten.

The first pass ranker 422 may utilize the rAffinity scores 414 or the MOO scores 416 to generate a first score for each notification 402. A predetermined number of the notifications 402 with the highest first scores are then selected as the results, referred to as first notifications 404. The remaining notifications are then discarded from further consideration.

In some example embodiments, a second pass ranker 424 receives the initially sorted and ranked results from the first pass ranker 422 and applies additional techniques to further refine and improve the ranking of rAffinity scores. The second pass ranker 424 is used to provide more accurate and relevant results on a reduced set of notifications. The second pass ranker 424 then takes the first notifications 404 as inputs and performs a second ranking of the first notifications 404. The second pass ranker 424 is a machine learning model that generates a second ranking score for the first notifications 404. The second pass ranker 424 may use the first notifications 404, the rAffinity scores 414, and additional factors for generating the second ranking score. In some example embodiments, only a single ranker is used, which is a combination ranker from the first pass ranker and the second pass ranker.

In some example embodiments, the second pass ranker 424 is a reinforcement learning model that reads a list of features and optimizes a set of balanced goals (e.g., pClick, session, deltaClick, etc.). The second pass ranker 424 ranks the first notifications 404 and provides the ranked notifications 406 to the notification service 426 for transmission to the creator (e.g., via a notification email, an alert, a presentation in the user feed). The notifications service 426 can publish notifications to the user using application services or push services to a user device. While a multi-pass ranking system is disclosed in the example embodiment of FIG. 4, a person having ordinary skill in the art can see that any number of ranking systems may be used to determine a final ranking score for the rAffinity.

While the rAffinity scores 414 are based on an overall quality of a connection between the users, content creator 101 and viewer 103, other factors can be used to improve the ranking of the notifications, such as a similarity of the profile data of the users. For example, user profile data can be used by the second pass ranker 424 to rank the first notifications 404. The profile data may include particular data points as disclosed herein, such as, but not limited to, career, education, age, gender, location, interests, and so forth.

Figure 5:
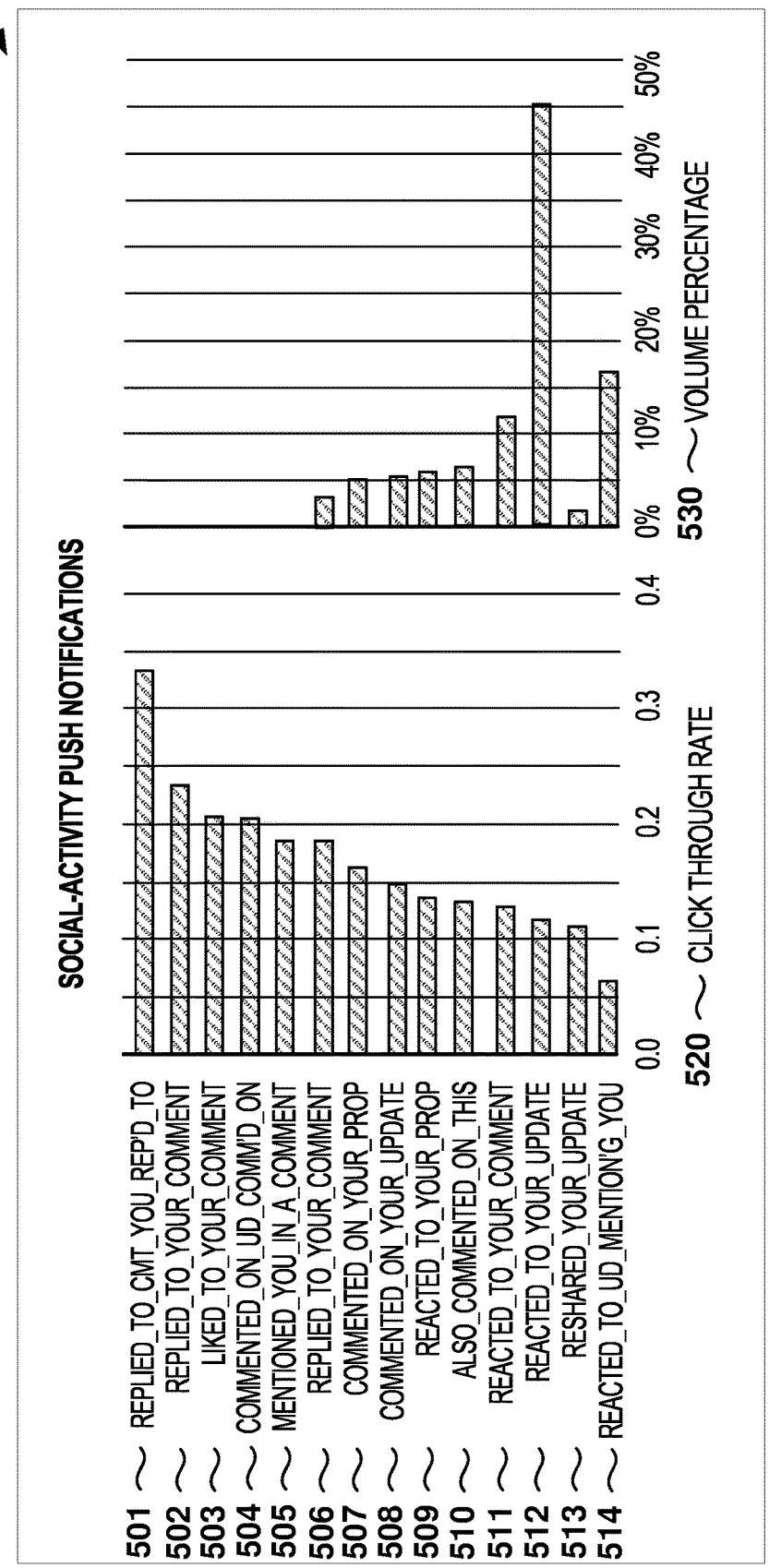
FIG. 5 is a social-activity (SA) push notification chart depicting Click-Through-Rates (CTR) for some notification types and volume percentages, according to example embodiments.

FIG. 5 is a social-activity (SA) push notification chart 500 depicting CTRs 520 for some notification types and volume percentages 530, according to example embodiments. An SA notification is a notification delivered to the creator to notify the creator that a specific viewer has interreacted with the content created by the creator.

The responses of the creators to SA notifications are compiled to measure how content creators react to feedback from viewers, which can be leveraged to calculate the rAffinity (e.g., creator-to-viewer affinity). The SA notification logged data can also include information regarding notifications between any type of users beyond creator and viewer.

Not all viewers are equally important in motivating all creators. SA notifications channel feedback to creators through different mechanisms of notification (e.g., in-application notifications, email notifications, push notifications, etc.) to alert the creator of different types of viewer engagement with the content. Further, rAffinity can be used to improve session growth (e.g., generating more user interaction) by increasing notification volume percentage 530 (e.g., the percentage of notifications sent on the communications network) without diminishing click-through-rate (CTR) 520.

The push notification chart 500 includes data for different types of notifications: replied to a comment you replied to 501, replied to your comment 502, liked your comment 503, commented on update you commented on 504, mentioned you in a comment 505, replied to your comment 506, commented on your proposal 507, and commented on your update 508 provide less interaction than notifications labeled reacted to your proposal 509, also commented on this 510, reacted to your comment 511, reacted to your update 512, researched your update 513, and reacted to update mentioning you 514.

For each type of notification, the CTR is presented in a horizontal bar showing how creators responded to the different types of notifications, that is, how often the creators clicked on the notification. In the illustrated example, the different types of notifications are sorted according to the CTR. For example, replied to a comment you replied to 501 has a CTR of 36%, replied to your comment 502 has a CTR or 27%, liked your comment 503 had a CTR of 21%, and the like.

One or more of the CTRs may be used to calculate the rAffinity, or any combination thereof, where the CTRs measure how often creators clicked on each type of notification. In other words, rAffinity can be calculated for leveraging which user's feedback matters more and using the calculated rAffinity score further to improve the relevance of such notifications as displayed in FIG. 5.

Further, the volume percentages 530 show the percentage of the total number for the categories, e.g., reacted to your update 512 has the highest volume percentage in this example.

In some example embodiments, an adjustment factor may be used to adjust the rAffinity. One example of an adjustment factor is for a user that has indicated their preferences for the viewers desired. In these cases, where the creator has expressly configured preferences, the preferences of the creator will obtain a higher rAffinity score than other viewers not in the preferred group.

Figure 6:
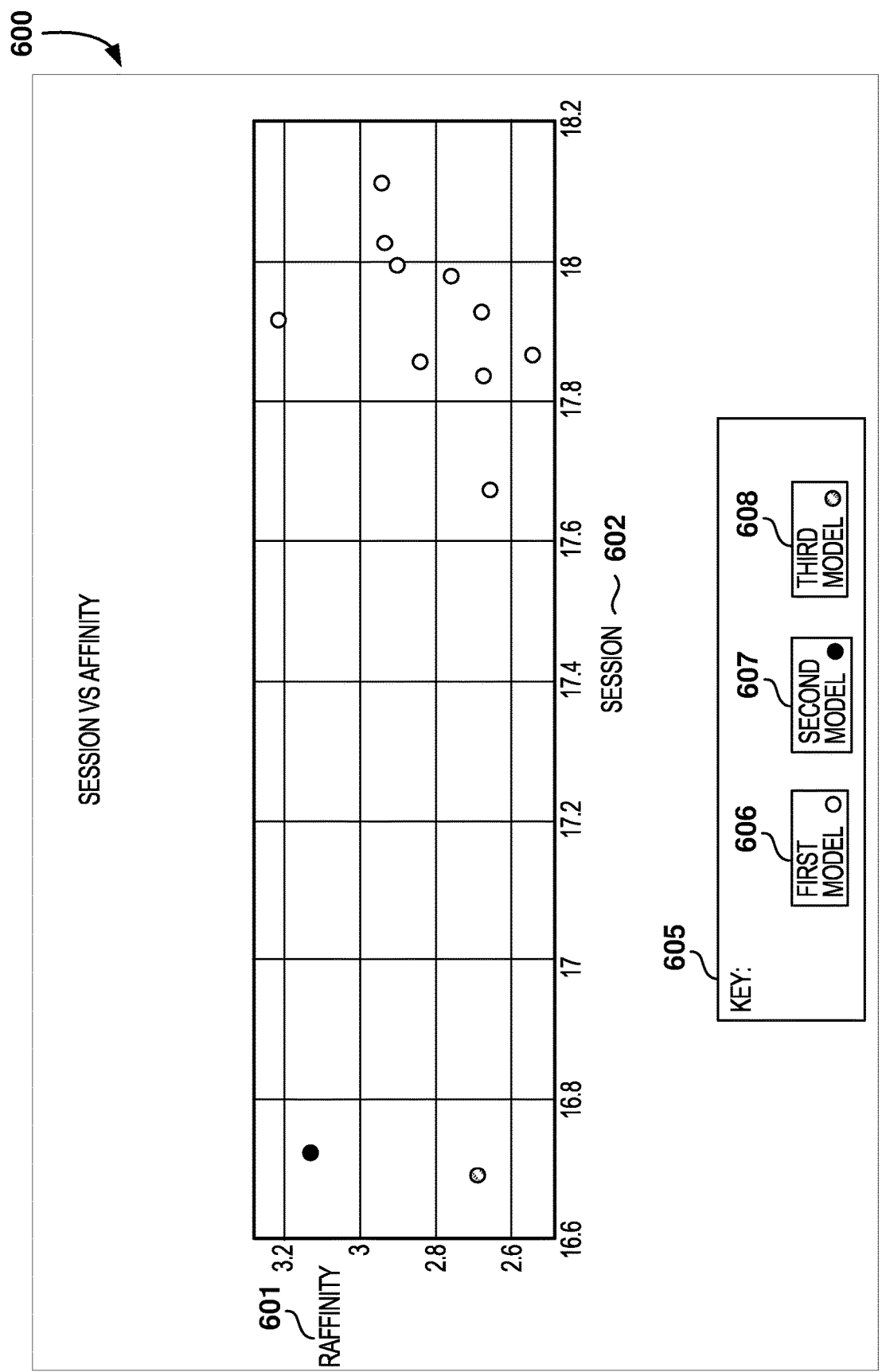
FIG. 6 is a chart depicting comparisons of sessions based on relational affinity, in accordance with some example embodiments.

FIG. 6 depicts a scatter plot 600 illustrating a correlation between rAffinity 601 represented on the y-axis and user sessions 602 represented on the x-axis, according to some example embodiments. The scatter plot 600 illustrates the relationship between increased rAffinity scores and an increased number of user sessions. That is, when notifications associated with higher rAffinity scores are presented to the creators, the creators in turn generate the increased number of user sessions.

FIG. 6 includes a key 605 providing a visual representation of the different data points on the scatter plot 600 including the labels and corresponding symbols used on the plot. Each of the data points included in the scatter plot 600 represent comparable variables in three models 606, 607, and 608 resulting in different versions of the rAffinity score 414 by generating three different datasets on which the rAffinity model 310 was trained. For example, white-filled dots represent data points for a first model (e.g., viewer and creator preferences) 606, black-filled dots represent data points for a second model 607, and stripe-filled dots represent data points for a third model 608. As such, each of the data points depict the results for different example embodiments of the second pass ranker 424 as described and depicted in connection with FIG. 4, where each model is trained using different hyperparameters. The scatter plot data points of the different models depicted in FIG. 6 illustrate a relationship between viewer and creator preferences illustrated by the data points. Specifically, the impact of creator preferences about viewers the creator is interested in, pushes the communications network to notify more viewers and potential viewers, that are engaged with the communications network.

Figure 7:
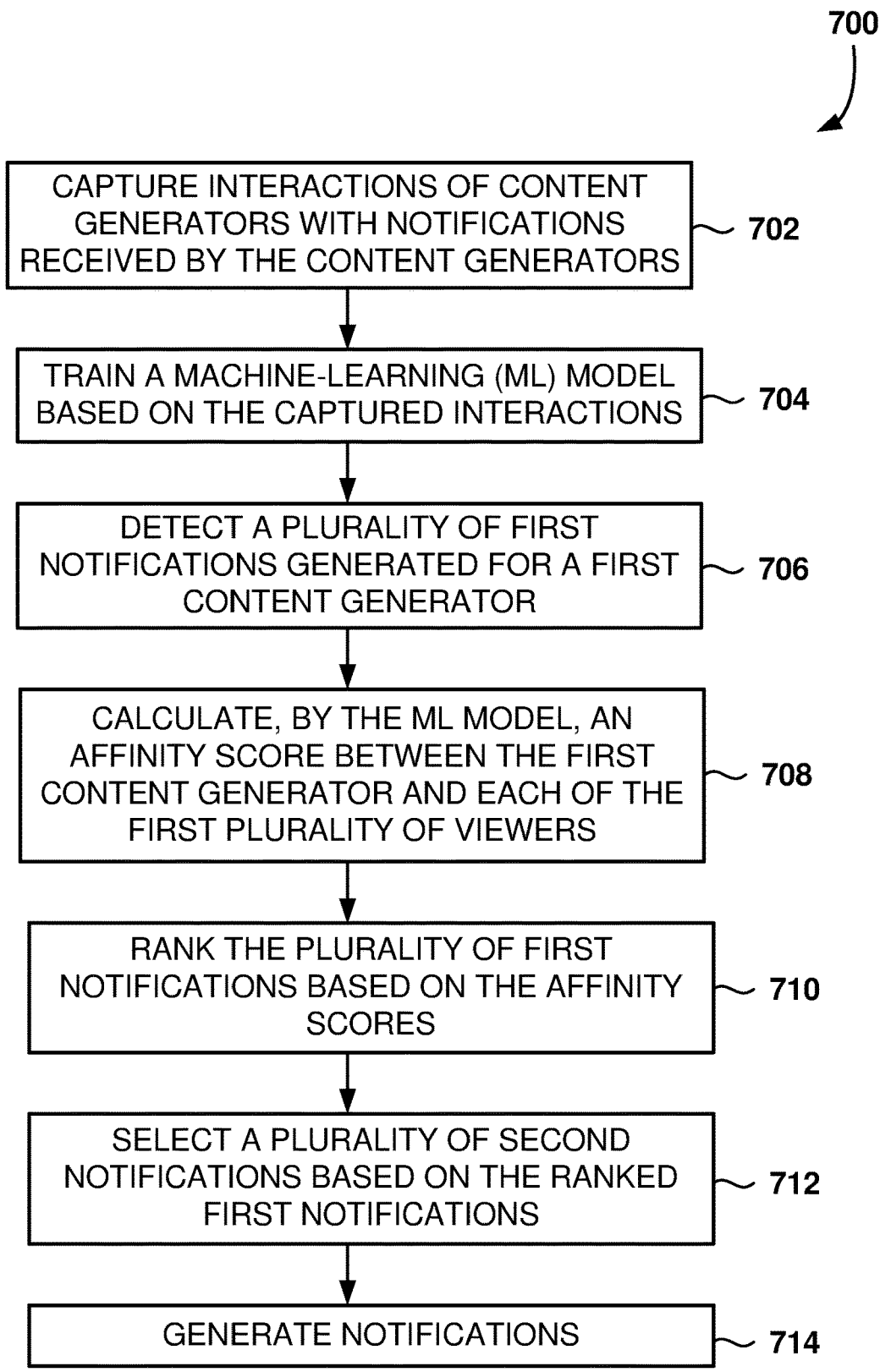
FIG. 7 is a flowchart of a method for selecting notifications based on the rAffinity score, according to some example embodiments.

FIG. 7 is a flowchart of a method 700 for selecting notifications based on the rAffinity score, according to some example embodiments. While the various operations in this flowchart are presented and described sequentially, one of ordinary skill will appreciate that some or all of the operations may be executed in a different order, be combined or omitted, or be executed in parallel.

Operation 702 is for capturing interactions of content generators (e.g., creators) with notifications received by the content generators. The received notifications are associated with viewer responses to items generated by the content generators.

From operation 702, the method 700 flows to operation 704 for training a machine-learning (ML) model based on the captured interactions.

From operation 704, the method 700 flows to operation 706 for detecting a plurality of first notifications generated for a first creator. The plurality of first notifications is associated with interactions of a first plurality of viewers to content from the first creator;

From operation 706, the method 700 flows to operation 708 for calculating, by the ML model, an affinity score between the first creator and each of the first plurality of viewers.

From operation 708, the method 700 flows to operation 710 for ranking the plurality of first notifications based on the affinity scores of the first creator and the viewer associated with each first notification.

From operation 710, the method 700 flows to operation 712 to select a plurality of second notifications based on the ranked first notifications.

From operation 712, the method 700 flows to operation 714 for generating notifications for the first creator for the selected plurality of second notifications.

In one example, the affinity score between the first content generator and a first viewer is a probability that the first content generator interacts with a notification that the first viewer accessed content items created by the first content generator.

In one example, ranking the plurality of first notifications further comprises ranking the plurality of first notifications according to the affinity score between the first content generator and the viewer associated with the notification.

In one example, ranking the plurality of first notifications further comprises: calculating a MOO score based at least in part on the affinity score; and ranking the plurality of first notifications according to the MOO score between the first content generator and the viewer associated with the notification.

In one example, the training is based on a training set comprising values for responses to notifications, content generator profile information, and viewer profile information.

In one example, the second notifications are one of a subset of the first notifications or a new set of notifications.

In one example, the ML model receives as input an identifier of a content generator and an identifier of a viewer and generates the affinity score between the content generator and the viewer.

In one example, a first type of notification indicates if a given viewer reacted to a content item generated by the first content generator.

In one example, wherein a second type of notification indicates a name of a viewer that reacted to the content and a number of people that reacted to the content.

In one example, ranking the plurality of first notifications comprises: performing a first ranking of the plurality of first notifications; selecting a subset from the plurality of first notifications; and performing a second ranking on the selected subset to obtain the ranked first notifications.

Another general aspect is for a system that includes a memory comprising instructions and one or more computer processors. The instructions, when executed by the one or more computer processors, cause the one or more computer processors to perform operations comprising: capturing interactions of content generators with notifications received by the content generators, the received notifications being associated with viewer responses to content items generated by the content generators; training a machine-learning (ML) model based on the captured interactions; detecting a plurality of first notifications generated for a first content generator, the plurality of first notifications being associated with interactions of a first plurality of viewers to content items from the first content generator; calculating, by the ML model, an affinity score between the first content generator and each of the first plurality of viewers; ranking the plurality of first notifications based on the affinity scores of the first content generator and the viewer associated with each first notification; selecting a plurality of second notifications from the ranked first notifications; and generating notifications for the first content generator for the selected plurality of second notifications.

In yet another general aspect, a tangible machine-readable storage medium (e.g., a non-transitory storage medium) includes instructions that, when executed by a machine, cause the machine to perform operations comprising: capturing interactions of content generators with notifications received by the content generators, the received notifications being associated with viewer responses to content items generated by the content generators; training a machine-learning (ML) model based on the captured interactions; detecting a plurality of first notifications generated for a first content generator, the plurality of first notifications being associated with interactions of a first plurality of viewers to content items from the first content generator; calculating, by the ML model, an affinity score between the first content generator and each of the first plurality of viewers; ranking the plurality of first notifications based on the affinity scores of the first content generator and the viewer associated with each first notification; selecting a plurality of second notifications from the ranked first notifications; and generating notifications for the first content generator for the selected plurality of second notifications.

Figure 8:
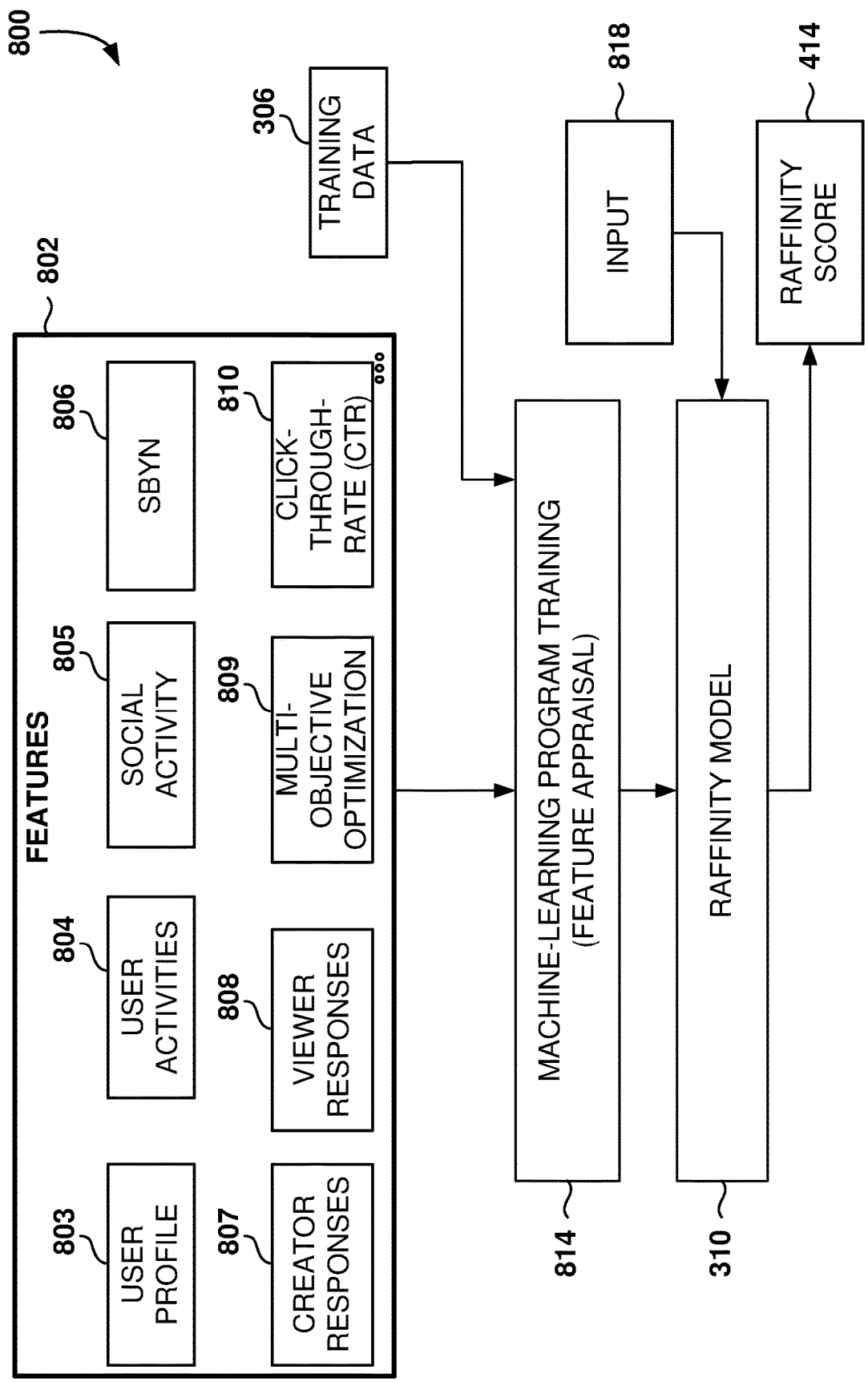
FIG. 8 illustrates the training and use of a machine-learning model for calculating an affinity score between two entities connected on a communications network, according to some example embodiments.

FIG. 8 illustrates a system 800 for the training and use of a machine-learning model, according to some example embodiments. In some example embodiments, a machine-learning (ML) model, referred to as the rAffinity model 310, calculates the rAffinity score.

Machine Learning (ML) is an application that provides computer systems the ability to perform tasks, without explicitly being programmed, by making inferences based on patterns found in the analysis of data. Machine learning explores the study and construction of algorithms, also referred to herein as tools, which may learn from existing data and make predictions about new data. Such machine-learning algorithms operate by building an rAffinity model 310 from example training data 306 in order to make data-driven predictions or decisions expressed as outputs or assessments, in this case the rAffinity score 414. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

The training data 306 comprises examples of values for the features 802. In some example embodiments, the training data comprises labeled data with examples of values for the features 802 and labels indicating the outcome, such as a creator responded to a notification that was presented, a user engaged with a post by another user, a user initiated another session based on a notification that was presented, a user accepted an invitation to connect, a connection was made, etc. The machine-learning algorithms utilize the training data 306 to find correlations among identified features 802 that affect the outcome. A feature 802 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as, numeric, strings, categorical, and graph. A categorical feature is a feature that may be assigned a value from a plurality of predetermined possible values (e.g., this animal is a dog, a cat, or a bird).

In one example embodiment, the features 802 may be of different types and may include one or more of user profile information 803, user activity information 804 (e.g., articles read, jobs applied to, connections made, articles posted, jobs posted), social activity information 805, shared-by-your-network (SBYN) information 806, creator responses to notifications 807, viewer responses to notifications 808, multi-objective optimization (MOO) information 809, click-through-rate (CTR) information 810, etc.

During training 814, the ML program, also referred to as ML algorithm or ML tool, analyzes the training data 306 based on the identified features 802 and configuration parameters defined for the training. The result of the training 814 is the ML model that is capable of taking inputs 818 to produce assessments, such as the rAffinity model 310 receiving as input an ID of a viewer and an ID of a creator and generating the rAffinity score 414 as the output.

Training a ML algorithm involves analyzing large amounts of data (e.g., from several gigabytes to a terabyte or more) in order to find data correlations. The ML algorithms utilize the training data 306 to find correlations among the identified features 802 that affect the outcome or assessment. In some example embodiments, the training data 306 includes labeled data, which is known data for one or more identified features 802 and one or more outcomes, such as the creator interacted with a notification.

In some example embodiments, results obtained by the rAffinity model 310 during operation (e.g., assessments produced by the model in response to inputs) are used to improve the training data 306, which is then used to generate a newer version of the model. Thus, a feedback loop is formed to use the results obtained by the model to improve the model.

Figure 9:
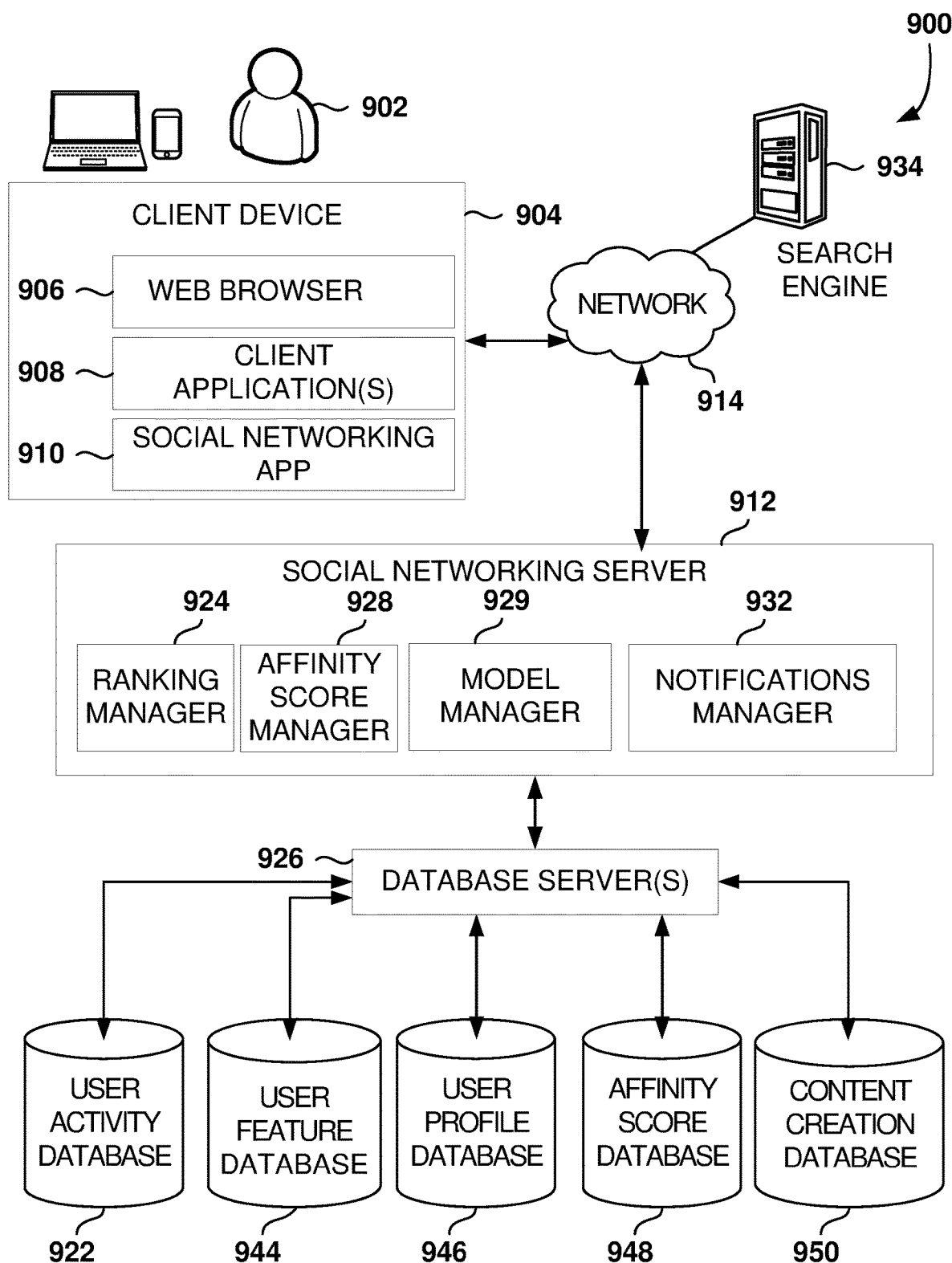
FIG. 9 is a block diagram illustrating a networked system, according to some example embodiments.

FIG. 9 is a block diagram illustrating a networked architecture 900, according to some example embodiments. The networked architecture 900 includes a networking server 912, illustrating an example embodiment of a high-level client-server-based network architecture. Embodiments are presented with reference to an online service, and, in some example embodiments, the online service is a social networking service.

The social networking server 912, a distributed system comprising one or more machines, provides server-side functionality via a network 914 (e.g., the Internet or a wide area network (WAN)) to one or more client devices 904. FIG. 9 illustrates, for example, a client device 904 with a web browser 906, client application(s) 908, and a social networking app 910 executing on the client device 904. The social networking server 912 is further communicatively coupled with one or more database servers 926 that provide access to one or more databases 922, 944, 946, 948, and 950.

The social networking server 912 includes, among other modules, a ranking module 924, an rAffinity score manager 928, a model trainer 929, and a notifications manager 932. The ranking module 924 is a module for calculating the likelihood of interaction between a content creator and a viewer. The rAffinity score manager 928 is a module for calculating an rAffinity between the content creator and the content viewer to determine the relationship and level of importance to the content creator. The model trainer 929 performs training for one or more models that produce the rAffinity model described herein. The notifications manager 932 is one or more modules for determining ranking of notifications such as described in the first pass ranker 422 and the second pass ranker 424 as described and depicted in connection with FIG. 4.

Returning to FIG. 9, the client device 904 may comprise, but is not limited to, a mobile phone, a desktop computer, a laptop, a tablet, a netbook, a multi-processor system, a microprocessor-based or programmable consumer electronic system, or any other communication device that the user 902 may utilize to access the social networking server 912. In some embodiments, the client device 904 may comprise a display module (not shown) to display information (e.g., in the form of user interfaces).

In one embodiment, the social networking server 912 is a network-based appliance, or a distributed system with multiple machines, which responds to initialization requests or search queries from the client device 904. One or more users 902 may be a person, a machine, or other means of interacting with the client device 904. In various embodiments, the user 902 interacts with the networked architecture 900 via the client device 904 or another means.

In some embodiments, if the social networking app 910 is present in the client device 904, then the social networking app 910 is configured to locally provide the user interface for the application and to communicate with the social networking server 912, on an as-needed basis, for data and/or processing capabilities not locally available (e.g., to access a user profile, to authenticate a user 902, to identify or locate other connected users 902, etc.). Conversely, if the social networking app 910 is not included in the client device 904, the client device 904 may use the web browser 906 to access the social networking server 912.

In addition to the client device 904, the social networking server 912 communicates with the one or more database servers 926 and databases. In one example embodiment, the social networking server 912 is communicatively coupled to the user activity database 922, a user feature database 944, a user profile database 946, an rAffinity score database 948, and content creation database 950 holding experiment data resulting from rAffinity testing of models. The databases may be implemented as one or more types of databases including, but not limited to, a hierarchical database, a relational database, a graph database, an object-oriented database, one or more flat files, or combinations thereof.

In some example embodiments, when a user 902 initially registers to become a user 902 of the social networking service provided by the social networking server 912, the user 902 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 946. Similarly, when a representative of an organization initially registers the organization with the social networking service provided by the social networking server 912, the representative may be prompted to provide certain information about the organization, such as a company industry.

While the database server(s) 926 are illustrated as a single block, one of ordinary skill in the art will recognize that the database server(s) 926 may include one or more such servers. Accordingly, and in one embodiment, the database server(s) 926 implemented by the social networking service are further configured to communicate with the social networking server 912.

The networked architecture 900 may also include a search engine 934. Although only one search engine 934 is depicted, the network architecture 900 may include multiple search engines 934. Thus, the social networking server 912 may retrieve search results (and, potentially, other data) from multiple search engines 934. The search engine 934 may be a third-party search engine.

Figure 10:
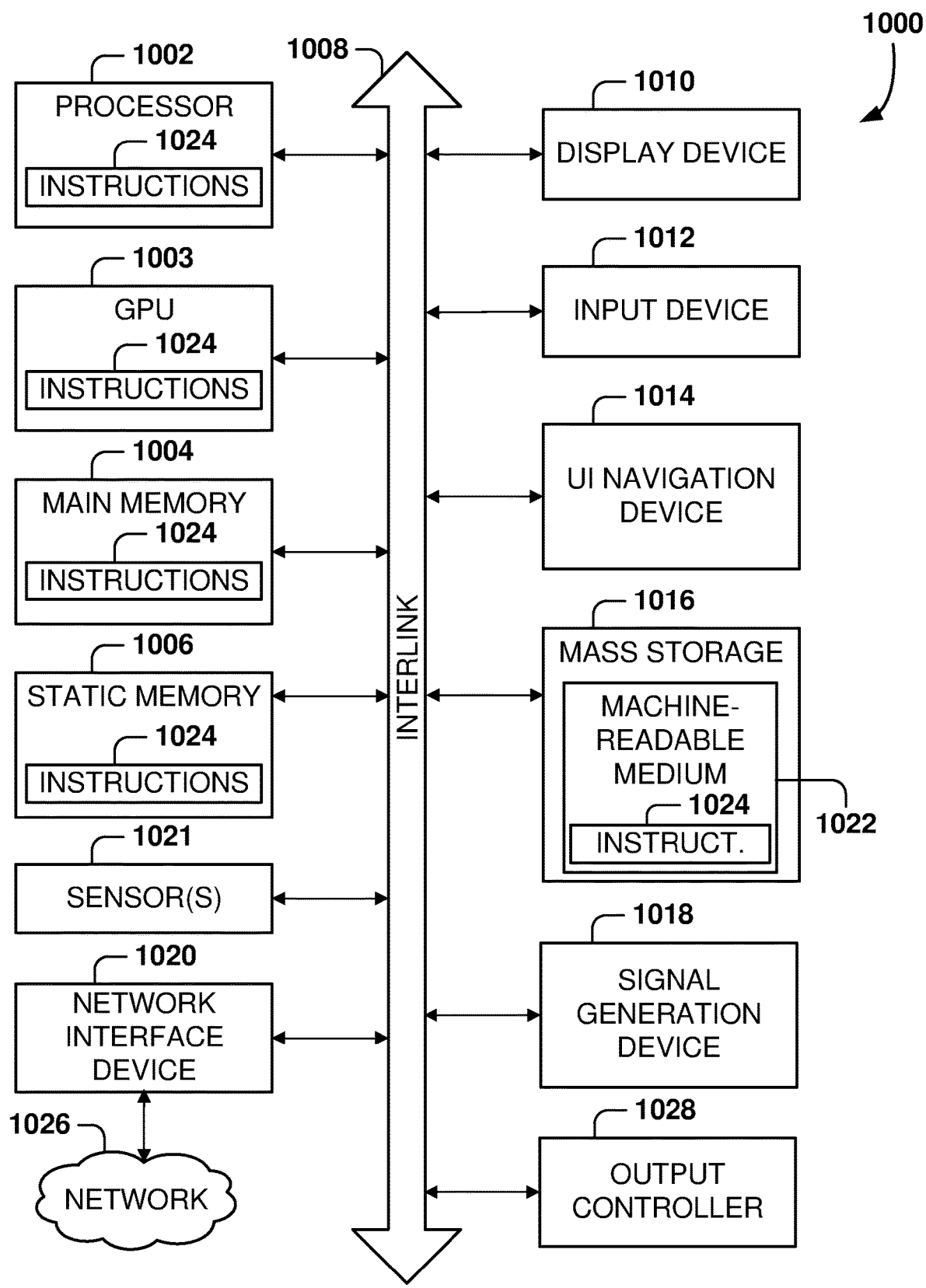
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
capturing interactions of content generators with notifications received by the content generators, the received notifications being associated with viewer responses to content items generated by the content generators;
training a machine-learning (ML) model based on the captured interactions;
detecting a plurality of first notifications generated for a first content generator, the plurality of first notifications being associated with interactions of a first plurality of viewers to content items from the first content generator;
calculating, by the ML model, an affinity score between the first content generator and each of the first plurality of viewers;
ranking the plurality of first notifications based on affinity scores of the first content generator and a viewer associated with each first notification, wherein ranking the plurality of the first notifications comprises calculating a multi-objective optimization (MOO) score based at least in part on the affinity score, and ranking the plurality of the first notifications according to the MOO score between the first content generator and the viewer associated with the notification;
selecting a plurality of second notifications from the ranked plurality of first notifications; and
generating notifications for the first content generator for the selected plurality of second notifications.

2. The method as recited in claim 1, wherein the affinity score between the first content generator and a first viewer is a probability that the first content generator interacts with a notification that the first viewer accessed content items created by the first content generator.

3. The method as recited in claim 1, wherein ranking the plurality of first notifications further comprises:
ranking the plurality of first notifications according to the affinity score between the first content generator and the viewer associated with the notification.

4. The method as recited in claim 1, wherein the training is based on a training set comprising values for responses to notifications, content generator profile information, and viewer profile information.

5. The method as recited in claim 4, wherein the second notifications are one of a subset of the first notifications or a new set of notifications.

6. The method as recited in claim 1, wherein the ML model receives as input an identifier of a content generator and an identifier of a viewer and generates the affinity score between the content generator and the viewer.

7. The method as recited in claim 1, wherein a first type of notification indicates if a given viewer reacted to a content item generated by the first content generator.

8. The method as recited in claim 1, wherein a second type of notification indicates a name of a viewer that reacted to the content and a number of people that reacted to the content.

9. The method as recited in claim 1, wherein ranking the plurality of first notifications comprises:
performing a first ranking of the plurality of first notifications;
selecting a subset from the plurality of first notifications; and
performing a second ranking on the selected subset to obtain the ranked first notifications.

10. A system comprising:
a memory comprising instructions; and
one or more computer processors, wherein the instructions, when executed by the one or more computer processors, cause the system to perform operations comprising:
capturing interactions of content generators with notifications received by the content generators, the received notifications being associated with viewer responses to content items generated by the content generators;
training a machine-learning (ML) model based on the captured interactions;
detecting a plurality of first notifications generated for a first content generator, the plurality of first notifications being associated with interactions of a first plurality of viewers to content items from the first content generator;
calculating, by the ML model, an affinity score between the first content generator and each of the first plurality of viewers;
ranking the plurality of first notifications based on affinity scores of the first content generator and a viewer associated with each first notification, wherein ranking the plurality of the first notifications comprises calculating a multi-objective optimization (MOO) score based at least in part on the affinity score, and ranking the plurality of the first notifications according to the MOO score between the first content generator and the viewer associated with the notification;
selecting a plurality of second notifications based on the ranked plurality of first notifications; and
generating notifications for the first content generator for the selected plurality of second notifications.

11. The system as recited in claim 10, wherein the affinity score between the first content generator and a first viewer is a probability that the first content generator interacts with a notification that the first viewer accessed content created by the first content generator.

12. The system as recited in claim 10, wherein ranking the plurality of first notifications further comprises:
ranking the plurality of first notifications according to the affinity score between the first content generator and the viewer associated with the notification.

13. The system as recited in claim 10, wherein the training is based on a training set comprising values for responses to notifications, content generator profile information, and viewer profile information.

14. A tangible machine-readable storage medium including instructions that, when executed by a machine, cause the machine to perform operations comprising:
capturing interactions of content generators with notifications received by the content generators, the received notifications being associated with viewer responses to content items generated by the content generators;
training a machine-learning (ML) model based on the captured interactions;
detecting a plurality of first notifications generated for a first content generator, the plurality of first notifications being associated with interactions of a first plurality of viewers to content items from the first content generator;
calculating, by the ML model, an affinity score between the first content generator and each of the first plurality of viewers;
ranking the plurality of first notifications based on affinity scores of the first content generator and a viewer associated with each first notification, wherein ranking the plurality of the first notifications comprises calculating a multi-objective optimization (MOO) score based at least in part on the affinity score, and ranking the plurality of the first notifications according to the MOO score between the first content generator and the viewer associated with the notification;
selecting a plurality of second notifications based on the ranked plurality of first notifications; and
generating notifications for the first content generator for the selected plurality of second notifications.

15. The tangible machine-readable storage medium as recited in claim 14, wherein the affinity score between the first content generator and a first viewer is a probability that the first content generator interacts with a notification that the first viewer accessed content created by the first content generator.

16. The tangible machine-readable storage medium as recited in claim 14, wherein ranking the plurality of first notifications further comprises:
ranking the plurality of first notifications according to the affinity score between the first content generator and the viewer associated with the notification.

17. The tangible machine-readable storage medium as recited in claim 14, wherein the training is based on a training set comprising values for responses to notifications, content generator profile information, and viewer profile information.

* * * * *